Oct. 8, 1940.  W. F. ALLER  2,216,796
MEASURING INSTRUMENT
Filed June 3, 1939   3 Sheets-Sheet 1
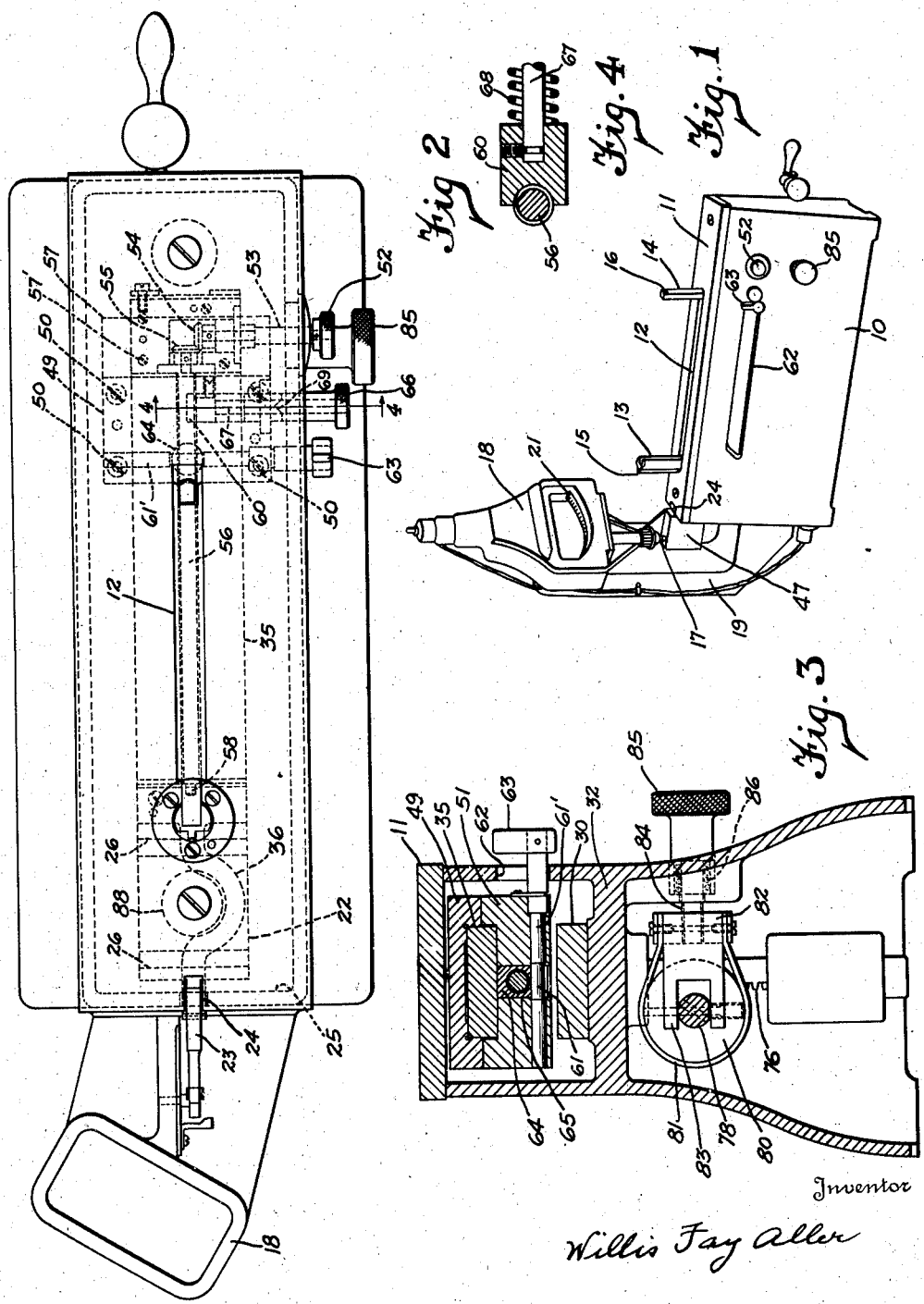
Inventor
Willis Fay Aller
By Maréchal & Noé
Attorney

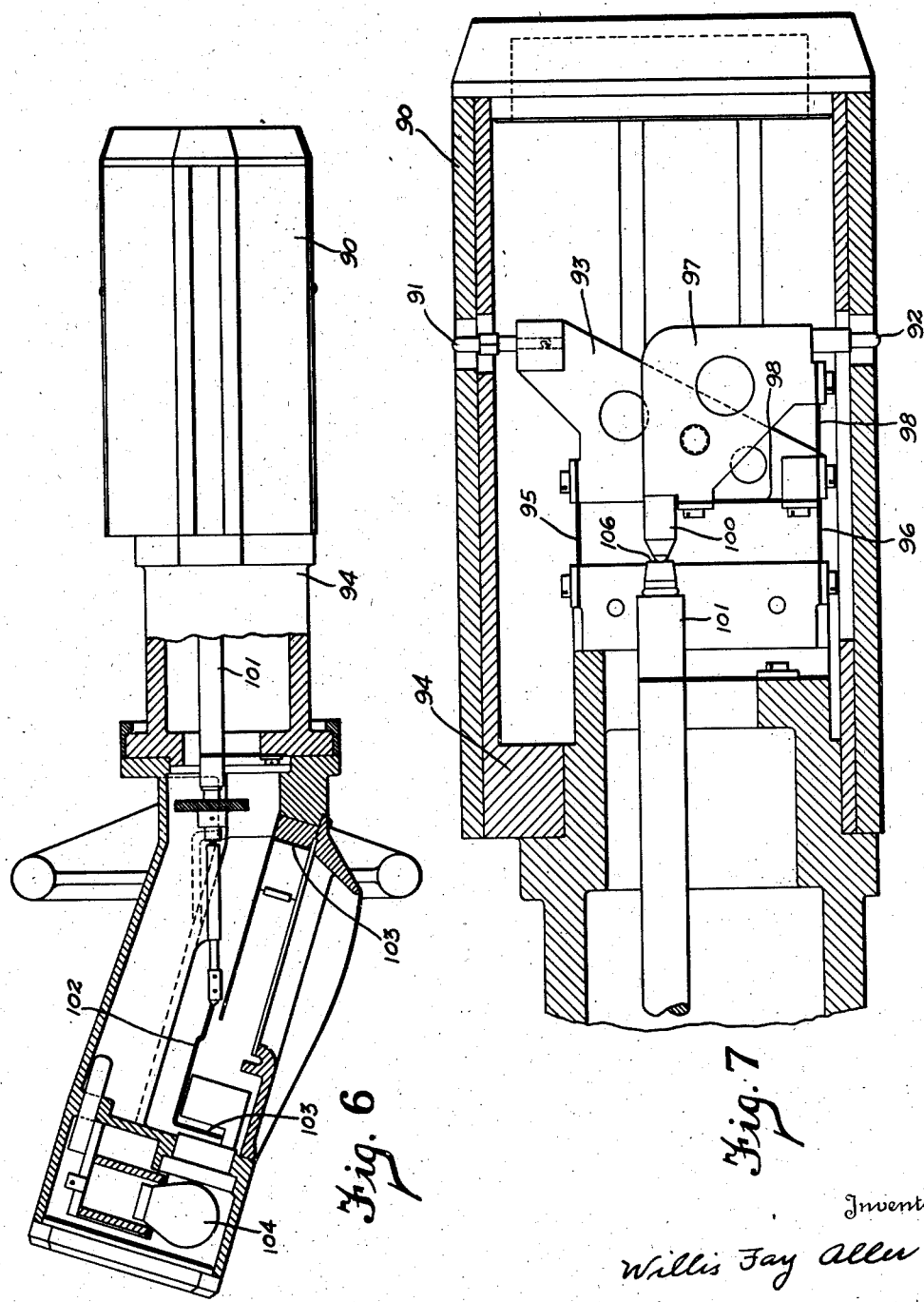

Patented Oct. 8, 1940

2,216,796

UNITED STATES PATENT OFFICE 2,216,796

MEASURING INSTRUMENT

Willis Fay Aller, Dayton, Ohio, assignor to The Sheffield Gage Corporation, Dayton, Ohio, a corporation of Ohio Application June 3, 1939, Serial No. 277,182

13 Claims. (Cl. 33—147)

This invention relates to measuring or gaging apparatus.

One object of the invention is the provision of a gage having a pair of cooperating gaging elements both of which are adapted for movement on a suport in a gaging operation, the relative movement of the gaging elements being effective on an indicating mechanism for gaging or comparing the size of workpieces with a high degree of accuracy.

Another object of the invention is the provision of a gage of the character mentioned in which one of the gaging elements provides a support or mounting for a part operated by the other gaging element, in a gaging operation, such part being operably connected to the indicating mechanism so that simultaneous equal movement of the gaging elements in the same direction is without effect on the indicating mechanism.

Another object of the invention is the provision of a gage having a work-supporting table on which the work being gaged is supported for contact with gaging elements projecting through the table, both of the gaging elements being supported for movement toward and from one another and operably connected to an indicating mechanism by a motion-transmitting device which provides means eliminating operating effect on the indicating mechanism when the gaging elements move equal amounts in the same direction.

Another object of the invention is the provision of a gage having a pair of cooperating gaging elements both of which are adapted for movement on a support in a gaging operation and having equal pressure contact with opposed portions of the work piece so that the size of the work piece may be gaged or compared with a high degree of accuracy.

Another object of the invention is the provision of a gage of the character mentioned in which both gaging elements are supported by pairs of parallel spring blades affording movement of the gaging elements in substantially parallel rectilinear directions.

Other objects and advantages of the invention will be apparent from the following description, the appended claims, and the accompanying drawings.

In the drawings, in which the same reference numerals have been used to designate the same parts in the several views:

Fig. 1 is a perspective view of a measuring instrument or gage embodying the present invention;

Fig. 2 is a top plan view of the gage;

Fig. 3 is a vertical section on the line 3—3 of Fig. 5;

Fig. 4 is a section on the line 4—4 of Fig. 2;

Fig. 6 is a side view of a gage of somewhat modified form, shown partly in longitudinal section; and Fig. 7 is an enlarged sectional view corresponding to Fig. 6.

Figure 5:
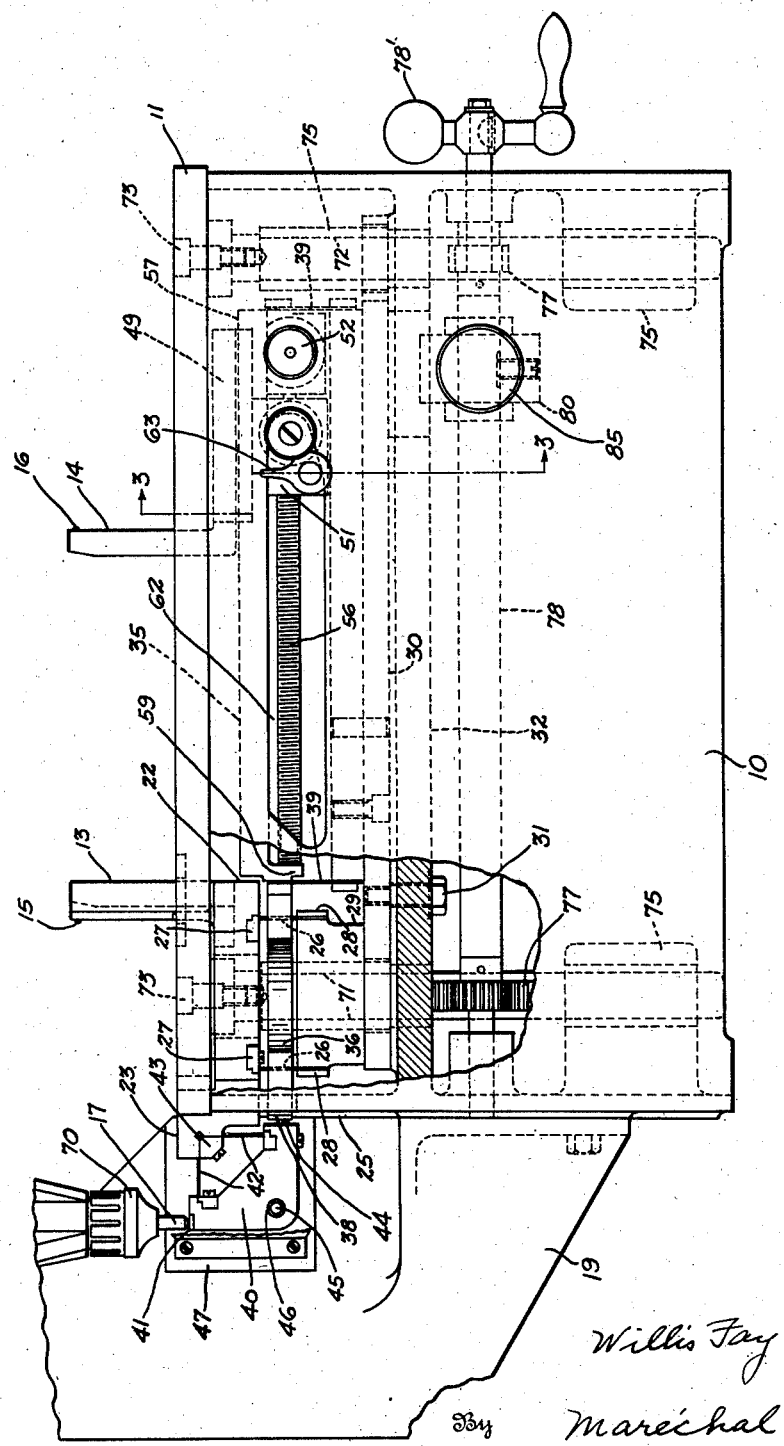
Fig. 5 is a side elevation of the gage, omitting the upper portion of the indicating mechanism and showing a part of the side wall of the supporting housing broken away.

The invention hereof and as illustrated in one of its preferred embodiments in Figs. 1 to 5 inclusive is shown as applied to a gage for measuring or checking the diameters of workpieces. As will be apparent from Fig. 1, the gage comprises a supporting housing 10 having a work-supporting table 11 on which the workpiece may be placed while being gaged or compared with a piece of standard size. Projecting upwardly through a slot 12 in the table are cooperating gaging posts 13 and 14, having gaging points 15 and 16 respectively. As shown the gaging points are on the outer sides of the posts so that internal diameters of workpieces can be gaged. The relative movement of the gaging posts operates mechanism supported by the housing to control the operation of a plunger 17 or equivalent operating member of a gaging instrument 18 which is carried by a fixed standard 19 projecting from an end of the supporting housing 10.

The gaging instrument 18 may be of any suitable construction incorporating an indicating or a measuring device responsive to the movements of the operating plunger 17. It may comprise a movable target operably connected to the plunger 17 and adapted to move across the path of a light beam so as to cast a shadow on the scale 21, and suitable means for yieldingly urging the plunger 17 in a downward direction, as set forth in the application of Willis Fay Aller, Serial No. 205,488, filed May 2, 1938.

As shown more particularly in Figs. 2 to 5 inclusive, the gaging post 13 is fixed to a bar 22 which extends below the table 11, the end 23 of the bar being of reduced width and projecting through a slot 24 in the end wall 25 of the supporting housing and in the end of the table 11. The bar 22 is supported by means of a pair of parallel flexible spring blades 26 the upper ends of which are securely attached to the lower side of the bar by means of connection blocks 27, while the lower ends of the spring blades are secured by clamp blocks 28 to a stationary block 29 carried by a plate 30, which is securely fastened by means of bolts 31 to a horizontally extending wall portion 32 of the supporting housing. In a gaging operation, when the post 13 is in its normal position, the spring blades 26 are straight so that the bar 22 is yieldingly held but is afforded a limited amount of reciprocatory endwise movement.

The post 14 is carried by a bar 35 which extends in a generally horizontal direction below the table 11, the portion of the bar 35 which is nearer the gaging instrument being of reduced width and of goose-neck form as shown at 36, the outer end 38 of the bar projecting through the slot 24 below the outer end of the bar 22. The bar 35 is supported for horizontal rectilinear movement in the direction of the bar length by means of a pair of parallel flexible spring blades 39, the lower ends of which are securely fastened to the plate 30, while their upper ends are securely fastened by clamp blocks 40 to the wider portion of the bar 35 so that the latter is yieldingly mounted. When the gaging posts are so arranged that their gaging contacts are spaced apart the required distance corresponding for example to the internal diameter of the standard piece used for comparison, the spring blades 39 are straight.

The relative movement of the gaging posts 13 and 14 in a gaging operation is transmitted to the plunger 17 by means supported on one of the bars of the gaging elements and operated by the other bar and so arranged that simultaneous equal movement of the gaging elements in the same direction produces no movement of the plunger 17. Such a construction provides for equal gaging pressure of the two gaging points on the workpiece. If one of the gaging posts were fixed directly to the support, then some pressure might be applied by the operator on the workpiece tending to move it towards or away from the fixed gaging element and producing an uneven pressure contact of the two gaging elements, or even producing some deflection of the stationary gaging post, so that an error in the reading on the gaging instrument would result. However, with both of the gaging elements adapted for movement on the support and a motion-transmitting mechanism which faithfully and exactly transfers only the relative movement of the gaging posts to the plunger 17 a pressure applied to the workpiece by the operator tending to move the workpiece along the table towards the right or towards the left would not vary the reading obtained, since the gaging post 13 would move along in a horizontal direction and equalize its pressure against the workpiece with the pressure that is exerted by the other gaging post.

The relative movement of the end portions 23 and 38 of the two gaging elements, as herein shown, is transmitted to the plunger 17 by a block or lever 40 having a horizontal contact surface 41 which extends parallel to the direction of movement of the bars 22 and 35 and at right angles to the axis of the plunger 17 so that any horizontal movement of the contact surface 41 produces no raising or lowering effect upon the plunger 17. The block 40 is carried by a pair of flexible spring blades 42 which extend at a wide angle, preferably at an angle of 90°, converging towards the end portion 23 of bar 22, to which the ends of the blades are secured by a suitable clamp block 43. The block 40 is thus fulcrumed for movement substantially about the axis of intersection of the planes of the two blades 42 so that any horizontal movement imparted by the end 38 of bar 35, through a suitable contact point 44 on the lower portion of the block 40, will be faithfully and exactly transmitted to a corresponding vertical movement of the plunger 17. Only the relative movements of the gaging elements will be transmitted to the plunger 17, while small movements of the gaging elements equally in the same direction either towards the right or towards the left as viewed in Fig. 5 will maintain the same relative position of the block 40 with respect to its fulcrum axis. A stationary pin 45, fixed with respect to the housing 10 passes with a suitable clearance spacing through a hole 46 in the block 40 and limits the swinging movement of the block so as to prevent any undue motion that might excessively strain any parts of the gage. This pin 45 may be fixed in a casing 47 carried by the housing 10 and enclosing the sides and outer end of the block 40 and its supporting springs.

The gaging post 14 is manually adjustable so that its distance from the gaging post 13 can be changed in order to adapt the gage for checking a wide range of measurements. The post 14 is provided preferably as an integral part of a saddle 49 which is slidably mounted on the top and side surfaces of the bar 35. Fixed to the saddle 49 by means of screws 50 is a guide block 51, underlying the bar 35 and supporting a locking device for securing the saddle to the bar in any position of adjustment. The saddle 49 may be moved along the bar by the operator by turning a hand wheel 52 which is fixed to a shaft 53 journalled in a block 57 which is fixed to the bar 35 by screws 57'. Shaft 53 carries a bevel gear 54, which meshes with a bevel gear 55 mounted on the end of a threaded shaft 56 which is rotatably supported in the block 57 at one end of the screw and is rotatably mounted at its other end by a cylindrical extension 58 in a projecting portion 59 on bar 35. The screw 56 is engaged by a half nut 60 which is guided against axial movement in the block 51 so that as the screw is turned, the block 51 travels axially of the screw until the desired setting of the gage post 14 is obtained. The bar 35 is then pressed tightly against the saddle 49 by the locking device which may be operated manually so as to secure these parts to one another. This locking device, as herein shown, comprises a cam or eccentric member 61 on a shaft 61' which is operated by a handle 63. The shaft projects freely through an opening 62 in the housing so as to be readily accessible. The shaft 61' is rotatably supported in the block 51 below a pressure stud 64 which is slidably supported in block 51 for vertical movement and which is adapted to press against the lower side of the bar 35 when moved upwardly by the eccentric 61. There is a passage 65 in the pressure stud 64, somewhat larger than the diameter of the screw 56, which projects through the stud, thus permitting vertical movements of the stud without producing a strain on the screw.

To provide for rapid movement of the gage post 14 along the length of the slot 12 in the housing, the half nut 60 may be disengaged from the screw 56 by pulling outwardly on a knob 66 which is fixed to a shaft 67 to which the half nut 60 is secured against relative axial movement along the shaft. The knob 66 projects through and is movable along the opening 62. A spring 68 normally holds the half nut 60 against the screw, but the tension of the spring is overcome when the knob 66 is pulled outwardly. A notched portion 69 on the inner end of the knob permits the half nut to be held in its retracted position by merely turning the knob through a small angle, so that the half nut may be held free from the screw while the operator adjusts the position of post 14 merely by pushing it or pulling it along the slot 12 until the approximate desired location of the post is obtained. He then releases the knob 66 and makes a further and closer adjustment of the saddle by turning the handle 52. In this way the gage post may be so set that a predetermined or a zero reading is produced on the gage when a standard piece of desired size is applied to the gaging contacts, and with such an adjustment the spring blades 26, 39 and 42 are in a normal straight attitude. The operator then locks the saddle in its adjusted position on the bar 35 by turning the lever 63. If a further and precise adjustment of the indicator to a zero indication is required that adjustment may be made on the instrument itself by the usual fine adjustment device, as by rotating the sleeve 78 in which the plunger 17 operates. The standard piece is then removed and the workpieces to be tested are successively applied to the table so that the reading on the instrument may be used as an indication as to the size relationship of the parts checked with respect to the required size. The downward pressure exerted by the plunger 17 on block 40 when the gaging posts are not in contact with a workpiece serves to yieldingly hold the gaging posts spaced slightly further apart than the desired spacing that obtains when a workpiece of the desired size is applied and produces a slight deflection in spring blades 26, 39 and 42.

The table 11 as herein shown is adapted for vertical movement with respect to the supporting housing 10 so that any workpiece may be checked at different distances along a bore or passage. In its lowered position, the table 11 is located on or just above the upper ends of the side walls and end walls of the housing. The table is carried by two vertical posts 71 and 72, projecting downwardly from the lower side of the table and attached thereto by screws 73. These posts are guided in bearings arranged in the block 29 and in bearing portions 75. Between the upper and lower bearing portions of the posts the latter are provided with rack teeth 76 as shown in Fig. 3, meshing with pinions 77 which are fixed to a longitudinal extending shaft 78 journalled in the opposite end walls of the supporting housing. One end of the shaft 78 projects from the housing and is provided with a crank or handle 78' which may be rotated by the operator to raise or lower the table. The control means for the table is preferably such that the table is held against downward movement in a yielding manner by means of a friction brake so that the operator can cause the descent of the table by pressing downwardly on the table during a gaging operation and without touching the handle 78'. For this purpose the shaft 78 is provided with a brake drum 80 engaged by a friction brake band 81 the ends of which are supported on a holder 82 horizontally guided for movement towards and away from the shaft 78 by means of a bifurcated portion 83. Threaded in the holder 82 is a screw 84, fixed to a control knob 85 which may be turned by the operator to adjust the tension of the spring 86 which applies to an adjustable pressure to the brakeband. The braking action of the brakeband may be overcome if the operator turns the handle 78' to cause the table to rise.

The post 71 passes through a hole 88 in the bar 22 and is of somewhat smaller size than the hole 88 so that horizontal movements of the bar 22 may take place to a limited extent without engaging the post. The post, however, prevents excessive movements of the bar such as might strain any portion of the apparatus or cause an undue deflection in the spring blades 26. The goose-necked portion 26 of the bar 35 is such as to extend around the post 71 with suitable operating clearance permitting longitudinal movement of the bar 35 without hitting the post.

In the form of construction illustrated in Figs. 6 and 7, the invention is shown embodied in a gaging instrument for checking internal diameters in which the work is applied to or supported on a work-carrying arbor. This arbor is a hollow member 90 of generally circular cross sectional form and of a diameter such as to permit the workpieces to be tested or checked to be applied axially and engaged with a pair of gaging points 19 and 29. The gaging point 91 is carried by a bar or block 93, which is mounted on the supporting housing 94 of the gage by means of a pair of parallel flexible spring blades 95 and 96 providing substantially rectilinear movement of the bar 93. The gaging contact point 92 is carried by an adjustable block or lever 97 which is carried by the bar 93, being connected to it by means of flexible spring blades 98 each of which is securely fastened at one end to the block 97 and at its other end to an attaching portion on the bar 93, the construction being such that the block 97 is fulcrumed for movement about an axis which is located substantially at the line of intersection of the planes of blades 98, and eliminating all lost motion in the connection. On the block 97 is a stud 100 which transmits the relative movement of the gaging elements to a plunger 101 which is axially movable in the supporting housing 94. Axial movements of the plunger 101 operate a swinging lever arm 102 having a target 103 which projects into the path of light rays coming from light source 104 so that the shadow of the target is apparent on the scale 105.

The contact surface 106 of the plunger 101 extends parallel to the lateral movement of the gaging elements so that both gaging elements may move the same amount in the same direction without producing endwise movement of the plunger 101. Both of the gaging elements are mounted on the support in a yielding manner, the spring blades 95 permitting both of them to move together in the same direction. However when a relative movement of the gaging points takes place the block 97 is rotationally moved with respect to the bar 93 and thus the relative movement of the gaging elements is transmitted to the plunger 101 of the gage. Since both of the gaging elements are movable with respect to the arbor on which the work is carried, both of them will exert a predetermined normal pressure on the opposite portions of the workpiece and even if the workpiece is not held by the operator to have a full-line contact with the upper side of the work-carrying arbor an accurate measurement of the diameter of the passage being checked will be obtained. Any special means for holding the workpiece so that one side of the workpiece is yieldingly held against the arbor is unnecessary.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gaging instrument comprising a pair of gaging elements adapted for simultaneous engagement with a workpiece, a support on which both of said elements are movably carried for gaging contact with the same workpiece, indicating means carried by said support, and a motion transmitting device operably interconnected to said indicating means for moving said indicating means in accordance with the relative movement of said gaging elements, said motion transmitting device having a portion thereof operated by one of said gaging elements and supported for movement on the other of said gaging elements and bodily movable with said other gaging element, said portion having means engageable with the indicating means and movable to operate the indicating means when said portion is moved relatively to said other gaging element and eliminating operating effect on said indicating means by equal movement of the gaging elements in the same direction.

2. A gaging instrument comprising a pair of gaging elements adapted for simultaneous engagement with a workpiece, a support on which both of said elements are movably carried for gaging contact with the same workpiece, indicating means carried by said support, and a motion transmitting device operably interconnected to both of said elements and to said indicating means for moving said indicating means in accordance with the relative movement of said gaging elements and comprising a part operated by one of said gaging elements and supported for movement on the other of said gaging elements and having an operating portion movable with said other gaging element without effect on said indicating means when the gaging elements are moved equally in the same direction and engaging the indicating means to be moved by said one gaging element transversely of the direction of movement of the other gaging element to move the indicating means.

3. A gaging instrument comprising a pair of gaging elements adapted for simultaneous engagement with a workpiece, a support on which both of said elements are movably carried for gaging contact with the same workpiece, indicating means carried by said support and having an axially movable motion transmitting member operable in a direction transverse of the direction of movement of the gaging elements, and a motion transmitting device operably interconnected to both of said elements and to said indicating means for moving said indicating means in accordance with the relative movement of said gaging elements and comprising a part operated by one of said gaging elements and supported for movement on the other of said gaging elements and having an operating end engaging said member and movable in a direction transversely of the direction of gaging movement of the gaging elements to operate the indicating means and maintaining a constant effect on the indicating means when said part is moved by the gaging element which supports it.

4. A gaging instrument comprising first and second gaging elements adapted for simultaneous engagement with a workpiece, a support, parallel blades mounting the first element for rectilinear movement on said support, means mounting the second element for yielding movement whereby both of said elements are movably carried for gaging contact with the same workpiece, indicating means carried by said support, and a motion transmitting device operably interconnected to said indicating means for moving said indicating means in accordance with the relative movement of said gaging elements, said motion transmitting device having a connection to the second gaging element for movement thereby and having a support for movement on the first gaging element and movable therewith without effect on the indicating means when the gaging elements are moved equally in the same direction.

5. A gaging instrument comprising a pair of gaging elements adapted for simultaneous engagement with a workpiece, a support, a pair of parallel spring blades for yieldingly mounting one of said elements on said support for rectilinear movement, spring blades yieldingly mounting the other of said elements for gaging contact with an opposite side of a workpiece contacted by said first-named element, indicating means carried by said support, and a motion transmitting device operably interconnected to said indicating means for moving said indicating means in accordance with the relative movement of said gaging elements, said motion transmitting device having a portion thereof engaging the indicating means and operated by one of said gaging elements and supported for pivotal movement on the other of said gaging elements so as to be bodily movable with said other gaging element without effect on the indicating means when the gaging elements are moved equally in the same direction.

6. A gaging instrument comprising a support, indicating means carried by said support and including an axially movable member and an indicator actuated thereby, an arm having an end engaging said member, a pair of spring blades extending substantially at right angles to one another and each fixed at one end thereof to said arm, a bar having a fixed connection to the other ends of said blades, said bar and blades supporting said arm for movement about an axis fixed with respect to said bar, a pair of parallel spring blades fixed at one end thereof to said bar and yieldingly mounting said bar on said support for substantially rectilinear movement in a direction transverse of said axially movable member, a gaging element on said bar, and a cooperating gaging element operating said arm.

7. A gaging instrument comprising a pair of gaging posts adapted for simultaneous engagement with a workpiece, a carrying bar for each of said posts, a support, means on said support for yieldingly mounting one of said bars for rectilinear movement, means on said support for yieldingly mounting the other of said bars for rectilinear movement parallel to the movement of the first bar, indicating means on said support, and transmitting means carried bodily by one of said bars and having an operable connection to the other bar for moving the indicating means in accordance with relative movement of said bars, said indicating means having an operating member engaging the transmitting means and movable transversely of the direction in which the transmitting means is bodily movable with said one bar.

8. A gaging instrument comprising a pair of gaging posts adapted for simultaneous engagement with a workpiece, a carrying bar for each of said posts, a support on which said bars are movably carried for gaging contact of the posts with the same workpiece, indicating means carried by said support and including an operating plunger, and a motion transmitting lever operably interconnected to said plunger for moving said plunger in accordance with the relative movement of said gaging posts, said motion transmitting lever having a portion thereof operated by one of said bars in a direction transverse of the plunger axis and a spring fulcrum support on the other of said bars.

9. A gaging instrument comprising a pair of gaging posts adapted for simultaneous engagement with a workpiece, a carrying bar for each of said posts, a support, a pair of parallel spring blades attached to said support and to one of said bars, a pair of parallel spring blades attached to said support and to the other of said bars and yieldingly supporting said bars for parallel reciprocatory movement in substantially horizontal directions, indicating means carried by said support, a motion-transmitting device operably interconnected to both of said bars and to said indicating means for moving said indicating means in accordance with the relative movement of said posts and comprising a part operated by one of said bars and supported for movement about an axis on the other of said bars, and a substantially horizontal work-carrying table on said support through which said posts project.

10. A gaging instrument comprising a pair of gaging posts adapted for simultaneous engagement with a workpiece, a carrying bar for each post, a support, means yieldingly mounting both carrying bars for parallel reciprocatory movement on said support, indicating means carried by said support, a motion transmitting lever having an arm in abutment with one of said bars and another arm in abutting contact with said indicating means and pivotally connected to the other bar for moving said indicating means only in accordance with relative movement of said gaging posts, and a table having a substantially horizontal upper work-supporting surface through which said posts project.

11. A gaging instrument comprising first and second gaging elements adapted for simultaneous engagement with a workpiece, a support, parallel spring blades mounting the first element for yielding rectilinear movement on said support, parallel spring blades mounting the second element for yielding rectilinear movement on said support whereby both of said elements are movably carried for gaging contact with the same workpiece, indicating means carried by said support and including a plunger operable in a direction transverse of the direction of reciprocatory movement of said gaging elements, and a motion-transmitting lever having a portion engaging said plunger for moving said indicating means in accordance with the relative movement of said gaging elements, said lever having a fulcrum on one of said gaging elements and a portion operably engaging the other gaging element.

12. A gaging instrument comprising a pair of gaging posts adapted for simultaneous engagement with a workpiece, a support, a carrying bar slidably supporting one of said gaging posts, a pair of parallel spring blades for yieldingly mounting said bar on said support for rectilinear movement of its gaging post towards and away from the other post, a screw carried by said bar, means carried by said bar for operating said screw, means in threaded engagement with said screw for moving the gaging post along the bar, means operable to lock the gaging post to the bar, and indicating means carried by said support and operably interconnected to said bar.

13. A gaging instrument comprising a support, indicating means carried by said support and including an axially movable member and an indicator actuated thereby, an arm having an end engaging said member, a pair of spring blades extending substantially at right angles to one another and each fixed at one end thereof to said arm, a bar having a fixed connection to the other ends of said blades, said bar and blades supporting said arm for movement about an axis located on said bar, a pair of parallel spring blades fixed at one end thereof to said bar and yieldingly mounting said bar on said support for substantially rectilinear movement in a direction transverse of said axially movable member, a gaging element on said bar, a second gaging element, a second bar, spring blades supporting said second gaging element for yielding movement from a normal position, an operating connection from said second gaging element to said arm, a work-supporting table on said support through which said gaging elements extend, and means for adjusting said table on said support in a direction 90° from the relative gaging movement of said gaging elements.

WILLIS FAY ALLER.